June 6, 1944. L. S. WALLE Re. 22,491

OVERLOAD PROTECTIVE MEANS

Original Filed Dec. 12, 1939

Inventor:
Ludwig S. Walle,
by Harry E. Dunham
His Attorney.

Reissued June 6, 1944

Re. 22,491

UNITED STATES PATENT OFFICE 22,491

OVERLOAD PROTECTIVE MEANS

Ludwig S. Walle, Lansdowne, Pa., assignor to General Electric Company, a corporation of New York Original No. 2,268,229, dated December 30, 1941, Serial No. 308,785, December 12, 1939. Application for reissue November 25, 1942, Serial No. 466,876

15 Claims. (Cl. 200—116)

My invention relates to overload protective means, more particularly to protective devices for electric energy translating apparatus of the oil immersed type such as transformers, and has for its object a simple, reliable and inexpensive protective device of this type.

My invention is especially useful in distribution transformers which are mounted in convenient but isolated positions in the distribution network and are inspected at infrequent intervals.

In carrying out my invention, I provide a protective device consisting of a thermally operable snap acting switching means which is connected in the secondary circuit of the transformer and immersed in the transformer oil so as to be responsive to the oil temperature. I also provide a latching means for holding the switching means in its open circuit position after it has opened and closed a plurality of times within a predetermined range. This latching means is operated by a second temperature responsive means in response to the current in the secondary circuit or to the oil in which it is immersed so as to move the latching means to hold the switch in its open circuit position. I also provide manually operated means operable from the exterior of the transformer casing for opening and closing the switching means.

Figure 2:
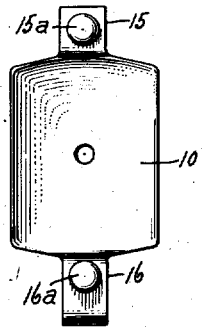

For a more complete understanding of my invention, reference should be had to the accompanying drawing showing a protective device embodying my invention applied to a transformer, while Fig. 2 is a front elevation view of the bimetallic snap operating means.

Referring to the drawing, I have provided overload protective means comprising in the form shown a snap action bimetallic thermostat 10 which constitutes a bridging switching member in the circuit of the secondary winding 11 of a transformer. This thermostat 10 has a substantially rectangular body portion which is supported at its center on a pin or post 12 secured to an insulating support 13 made of a suitable electrically insulating material such as slate.

The main rectangular portion of the thermostat has a concavo-convex form for the purpose of giving it a snap action. When the thermostat is in position to close the secondary circuit of the secondary winding 11, as shown in the drawing, the side of the thermostat adjacent the support 13 is concave. Upon an increase in temperature of the thermostat to a predetermined value, the unequal expansion of its two metals, the metal having the greater coefficient of expansion being adjacent the support 13, causes it to snap at some predetermined temperature to reverse its shape as indicated by the dotted line position 14. The side of the thermostat adjacent the support 13 is then convex. When the temperature of the thermostat drops to a predetermined point, the thermostat resumes the shape indicated in the drawing with a snap action.

As shown, the rectangular portion of the thermostat is provided at its opposite ends with central extensions 15 and 16 to which are secured electric switch contacts 15a and 16a respectively. These contacts cooperate with stationary contacts 17 and 18 secured to the support 13. Preferably, as shown, the stationary contacts are mounted on bolts or lugs which extend through the base and are clamped to the base by means of suitable nuts. The opposite ends of the bolts form connection terminals 19 and 20 for connection of the protective device including the thermostat 10 in circuit with the secondary winding 11.

Figure 1:
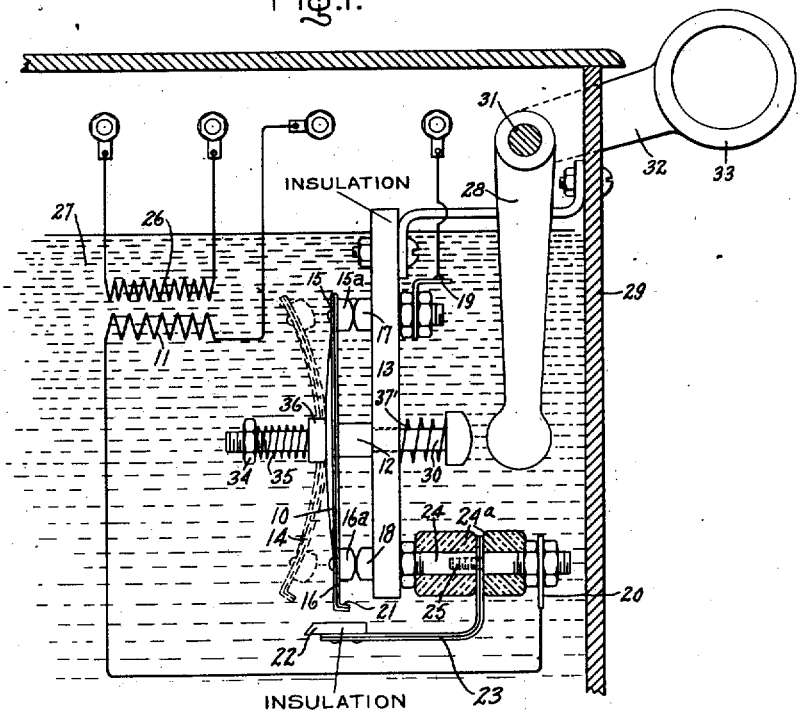

The extension 16 extends downward below the contact 16a and is bent toward the right-hand as seen in Fig. 1 of the drawing to form a latching projection 21. This projection 21 engages a latching member 22 made of electrically insulating material after the thermostat 10 has opened and closed the circuit a number of times within a predetermined range whereby the thermostat is held in the open circuit position.

The projection 22 is operated by a second bimetallic thermostat 23 to a latching position and, as shown, is mounted on the movable end of this thermostat. The opposite end of the thermostat is secured rigidly and in good heat conducting relation therewith to the bolt or post 24 forming the support for the stationary contact 18. To facilitate a good thermal contact, the post may be made in two parts secured together by a screw connection 25 so as to clamp the end of the thermostat 23 between the two parts.

Moreover, the bolt or post 24 has an electrical resistance such that it has substantially the same thermal characteristics as the transformer secondary winding 11 and primary winding 26. In other words, heat is generated in the bolt 24 by the current passing through it at such rate that the temperature rise of the bolt follows the temperature rise, and also temperature decrease, of the transformer windings. Preferably, to promote this temperature rise in the bolt, it is surrounded by a heat insulating jacket 24a made of a suitable heat and electrically insulating material such as fiber. This heat insulating jacket prevents the rapid cooling of the bolt by the surrounding oil 27 in the transformer.

This heat generated in the bolt 24 raises its temperature above the temperature of the surrounding oil and the heat is transferred by conduction to the thermostat 23. Also the oil itself, particularly on light over-currents, is heated by the windings and approximates the temperature of the windings. The oil will also have some effect on the heating of the thermostat 23. As the temperature of the thermostat 23 rises, its distortion moves the insulating latch 22 upward, as seen in Fig. 1, until finally the latch is in a position to engage the projection 21 and prevent the return snap action of the thermostat 10 to its closed circuit position, shown in the drawing. During the time that the thermostat 23 is being heated, the thermostat 10 will have been heated to snap to its open position and then cooled to snap to its closed position, several times.

In the operation of the transformer, the secondary current flowing through the thermostat 10 heats the thermostat. Also heat is imparted to the thermostat by the cooling fluid, shown as the oil 27 in which the two thermostats and the transformer windings are immersed. Upon the occurrence of a substantial overload current in the secondary winding the thermostat 10 is heated to a temperature causing it to snap to the reverse position indicated by dotted lines and thereby open the secondary circuit. It is contemplated that the temperature of the thermostat under such conditions will be considerably above the temperature of the oil in which it is immersed. Consequently, the thermostat is cooled rapidly by the oil and snaps to reclose the circuit after remaining in its open circuit position a short interval such as a few seconds.

This overload current, however, likewise heats the thermostat 23 although the response of the thermostat 23 is slower, it being heated as previously noted at a rate approximately the rate of heating of the transformer windings. Its temperature, however, is somewhat higher with substantial overloads than the temperature of the surrouning oil. When the thermostat 10 has opened and closed the circuit a number of times, such as five or more, the thermostat 23 will have moved the projection 23 to a latching position in which it holds the thermostat 10 in its open circuit position.

Of course the rate at which the thermostats are heated will depend upon the current in the secondary winding. The thermostat 10 will be adjusted or constructed ordinarily to open and close the circuit a number of times in response to an overload current of a predetermined high value by the time it is latched open by the second thermostat. In the event of a suddenly applied overload resulting in a current considerably greater than this predetermined current value, the thermostats will be heated at correspondingly increased rates, but will be cooled quickly because of the lower temperature of the transformer oil. As a result, the thermostat 10 will have approximately the same number of opening and closing operations as with the predetermined current value.

The plurality of reclosing operations provides for the resumption of service in the event that the excessively heavy load is removed during the opening and closing circuit interval. If the heavy overload persists, then the circuit is permanently latched open.

Moreover the thermostat 10 is constructed and arranged to remain open in response to a predetermined temperature which is the maximum permissible temperature of the oil. This temperature is not high enough to cause the thermostat to snap open, but it is high enough to cause it to remain open after it has snapped open, i. e., high enough to prevent reclosure of the thermostat. In the event that the oil reaches this temperature because of continued light overloads the thermostat 10 remains open until the oil cools regardless of whether it is secured open by the latch 22. Preferably this maximum oil temperature is not high enough, however, to cause the thermostat 23 to move the latch into an engaging position. It will thus be observed that during these persisent predetermined light overloads the thermostat 10 opens and closes the circuit an indefinite number of times, remaining open for relatively long time intervals, and is not finally latched open by the thermostat 23. The arcs generated by the opening of the circuit heat the oil and contribute in the raising of the oil temperature to the maximum value.

I have also provided manual means for bodily moving the thermostat 10 to its open and closed positions. This consists of an arm 28 inside the transformer tank 29 having its free end opposite the inner end of a rod 30 carrying the thermostat 10. The upper end of the arm 28 is pivoted on a shaft 31 which extends through the wall of the tank and has secured to it an exterior operating arm 32. On the end of the arm 32 is a link 33 through which the hook of an operating pole may be inserted to move the arm 32 downward and open the circuit. It is contemplated that the weight of the operating pole on the arm 32 will be sufficient to hold the thermostat 10 in its open circuit position.

As shown, the rod 30 extends through an aperture provided for it in the base 13, the post 12 constituting a flange secured to the rod 30, and also through an aperture in the thermostat 10. The left-hand end of the rod 30 is threaded and provided with an adjustment nut 34 bearing on a helical spring 35 which, in turn, presses against a collar 36 on the rod 30. This collar engages the thermostat 10 and holds it against the flange 12, or in a predetermined adjusted relation with the flange 12. A second spring 37 surrounding the opposite end of the rod 30 biases the rod in a right-hand direction. It will be understood that the springs 35 and 37 are strong enough to maintain the desired contact pressure and overpower substantially the thermostat 10.

When the latch 22 engages the projection 21, the thermostat 10 is held in its open circuit position regardless of the temperature to which it subsequently cools. The release of the thermostat 10 from the latch 22 is a manual operation whereby the thermostat 10 is moved bodily toward the left. It is carried out by pulling downward on the lever 32 to move thereby the supporting rod 30 and the thermostat 10 toward the left, as seen in the drawing, far enough to disengage the projection 21 from the latch. This manual release operation has of course the prerequisite that the thermostat 10 has cooled to such a temperature that it is trying to snap to its closed position and the thermostat 23 has cooled to such a temperature that it is trying to move the latch 22 downward to a position out of the path of the projection 21.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent in the United States is:

1. A protective device for a translating device immersed in oil comprising a bimetallic thermostat arranged to snap from one position to another in response to changes in temperature thereof, said thermostat being arranged to be immersed in the oil with the translating device so as to be responsive to the temperature of the oil, circuit control means actuated by said thermostat, said circuit control means being connected in a circuit of the translating device and being normally in a closed circuit position, connections for heating said thermostat in response to the current in said circuit, a second thermostat, latching means actuated by said second thermostat in response to a predetermined temperature of said second thermostat for holding said said first thermostat in its open circuit position, and means for manually moving said first thermostat to release it from said latching means.

2. A protective device comprising temperature responsive operating means arranged to move from one position to another position and back to said one position in response to changes in temperature thereof, circuit control means actuated by said operating means between closed and open circuit positions, said circuit control means being normally in a closed circuit position, connections for heating said operating means in response to the current in said control means, a second temperature responsive operating means, means actuated by said second operating means when heated to a predetermined temperature to hold said first operating means in its open circuit position, and connections for heating said second operating means in response to the current in said control means, said first operating means being heated to its operating temperature before said second operating means is heated to its operating temperature so that said first operating means operates said circuit control means a plurality of times before said second operating means moves said holding means to hold said first operating means in its open circuit position.

3. A protective device comprising a bimetallic thermostat arranged to snap from one position to another in response to changes in temperature thereof, circuit control means actuated by said thermostat between closed and open circuit positions, said circuit control means being normally in a closed circuit position, connections for heating said thermostat in response to the current in said control means, a second thermostat, stop means actuated by said second thermostat when heated to a predetermined temperature to hold said first thermostat in its open circuit position, and connections for heating said second thermostat in response to the current in said control means, said first thermostat being heated to its operating temperature before said second thermostat is heated to its operating temperature so that said first thermostat operates said circuit control means a plurality of times before said second thermostat moves said stop means to hold said first thermostat in its open circuit position.

4. A protective device comprising a pair of stationary contacts, means for connecting said contacts in circuit with an energy translating device, a bimetallic thermostat provided with spaced movable contacts engaging said stationary contacts to close a circuit through said thermostat, said thermostat being heated by the current passing through it and arranged when heated to a predetermined temperature to snap to another position and thereby move said movable contacts to open said circuit, a second thermostat having one end movable in response to changes in temperature, a latching member carried by the movable end of said second thermostat, means for heating said second thermostat in response to the current in said circuit at a rate substantially the same as the rate of heating of the translating device whereby said second thermostat moves said latching member in response to a predetermined maximum temperature to a position to hold said first thermostat in its open circuit position, said first thermostat being heated to its operating temperature before said second thermostat is heated to its operating temperature, and said first thermostat operating to open and close the circuit a plurality of times before said second thermostat moves said latching member to a position to hold said first thermostat in its open circuit position, and manually operated means for moving said first thermostat bodily to open said circuit.

5. A protective device for an electric translating device immersed in a cooling fluid, said device being arranged to be immersed in the cooling fluid with the translating device, comprising switching means arranged to be connected in a circuit of the translating device, temperature responsive operating means connected to said switching means so as to open and close said switching means in response to changes in the temperature of the cooling fluid and arranged to maintain said switching means in a closed circuit position when the temperature of said operating means is below a predetermined temperature and to move said switching means to an open circuit position when the temperature of said operating means is above said predetermined temperature, connections for heating said operating means in response to the current in a circuit of the translating device, and means for manually moving said temperature responsive means to open and close said switching means.

6. A protective device for an electric translating device immersed in oil, said device being arranged to be immersed in the oil with the translating device, comprising switching means arranged to be connected in a circuit of the translating device, temperature responsive operating means connected to said switching means so as to open and close said switching means in response to changes in the temperature of the oil and arranged to maintain said switching means in a closed circuit position when the temperature of said operating means is below a predetermined temperature and to move said switching means to an open circuit position when the temperature of said operating means is above said predetermined temperature, connections for heating said operating means in response to the current in a circuit of the translating device, a second temperature responsive operating means, means actuated by said second operating means in response to a predetermined temperature for holding said first operating means in its open circuit position, and connections for heating said second operating means in response to the current in a circuit of the translating device.

7. A protective device for an electric translating device immersed in oil, said device being arranged to be immersed in the oil with the translating device, comprising switching means arranged to be connected in a circuit of the translating device, temperature responsive operating means connected to said switching means so as to open and close said switching means in response to changes in the temperature of the oil and arranged to maintain said switching means in a closed circuit position when the temperature of said operating means is below a predetermined temperature and to move said switching means to an open circuit position when the temperature of said operating means is above said predetermined temperature, connections for heating said operating means in response to the current in a circuit of the translating device, temperature responsive latching means for holding said operating means in its open circuit position, and manually operated means for releasing said operating means from said latching means.

8. A protective device for an electric translating device immersed in a cooling fluid, said device being arranged to be immersed in the cooling fluid with the translating device, comprising a bimetallic thermostat arranged to snap from one position to another in response to changes in its temperature when immersed in the cooling fluid, circuit control means arranged for connection in a circuit of the translating device actuated by said thermostat between closed and open circuit positions, said circuit control means being normally in a closed circuit position, connections for heating said thermostat in response to the current in a circuit of said translating device, a second thermostat, latch means actuated by said second thermostat in response to a predetermined operating temperature to hold said first thermostat in its open circuit position, and connections for heating said second thermostat in response to the current in a circuit of said translating device, said first thermostat being heated to its operating temperature to open said circuit control means before said second thermostat is heated to its predetermined operating temperature so that said first thermostat operates to open and close said circuit control means a plurality of times before said second thermostat moves said latch means to hold said first thermostat in its open circuit position.

9. A protective device for an electric translating device immersed in oil, said device being arranged to be immersed in the oil with the translating device, comprising switching means arranged to be connected in a circuit of the translating device, temperature responsive operating means connected to said switching means so as to open and close said switching means in response to changes in the temperature of the oil and arranged to maintain said switching means in a closed circuit position when the temperature of said operating means is below a predetermined temperature and to move said switching means to an open circuit position when the temperature of said operating means is above said predetermined temperature, connections for heating said operating means in response to the current in the circuit of the translating device so as to cause said operating means to open and close said switching means after relatively short time intervals in response to a current in the circuit of the translating device of a predetermined high value and to open and close said switching means after relatively long time intervals in response to a current in the circuit of the translating device of a predetermined low value, and a second temperature responsive operating means for holding said first temperature responsive operating means in its open circuit position after a plurality of said short time interval operations.

10. A protective device for an electric translating device immersed in a cooling fluid, said device being arranged to be immersed in the cooling fluid with the translating device, comprising switching means arranged to be connected in a circuit of the translating device, temperature responsive operating means connected to said switching means so as to open and close said switching means in response to changes in the temperature of the cooling fluid and arranged to maintain said switching means in a closed circuit position when the temperature of said operating means is below a predetermined temperature and to move said switching means to an open circuit position when the temperature of said operating means is above said predetermined temperature, connections for heating said operating means in response to the current in the circuit of the translating device so as to cause said operating means to open and close said switching means after relatively short time intervals in response to a current in the circuit of the translating device of a predetermined high value and to open and close said switching means after relatively long time intervals in response to a current in the circuit of the translating device of a predetermined low value, a second temperature responsive operating means arranged to be immersed in the cooling fluid with the translating device, a latch operable by said second operating means to a position to hold said first temperature responsive operating means in its open circuit position, and means for heating said second temperature responsive operating means in response to the current in a circuit of the translating device to cause said second operating means to move said latch to said latching position after a plurality of said short time interval operations of said first operating means.

11. A circuit breaker comprising a first contact, a thermally responsive snap acting bimetal element carrying a second contact for engaging said first contact, an operating handle mounted solely for pivotal movement on a fixed pivot, an operating spring engaging a stationary support at one end and acting at all times to bias one of said contacts in one direction, said handle being operable to cause opening or closing of said contacts, and said bimetal element being operable when heated a predetermined amount to cause opening of said contacts irrespective of the position of said handle.

12. A circuit breaker comprising a first contact, a thermally responsive snap acting bimetal element, a second contact carried by said bimetal element for engaging said first contact, an operating spring engaging a stationary support at one end and acting at all times to bias one of said contacts in one direction, manually movable operating means operable to cause opening or closing of said contacts, said operating spring being free of connection with said manual operating means, said bimetal element when heated a predetermined amount operating to cause automatic opening of said contacts irrespective of the position of said manual operating means.

13. A circuit breaker comprising a pair of stationary contacts, a snap-acting bimetal element having a normal concavo-convex flexed position, a pair of arms of conducting material secured to said element adjacent the edge thereof and extending outwardly therefrom on opposite sides, a pair of movable contacts mounted on the flexed ends of said arms for engaging said stationary contacts, a manual operating member for moving said element to manually open or close the contacts, said bimetal element when heated a predetermined amount by overload current operating to snap from its normal flexed position to an opposite concavo-convex position thereby automatically to open the contacts irrespective of the position of said manual operating member.

14. A circuit breaker comprising a stationary contact, a snap-acting bimetallic element having a normal concavo-convex flexed position, a movable contact carried by said element for cooperation with said fixed contact, a manual operating member for moving said element to manually open or close said contacts, said bimetallic element when heated a predetermined amount by overload current operating to snap from said normal flexed position to an opposite concavo-convex position thereby automatically to open the contacts irrespective of the position of said manual operating member.

15. A circuit breaker comprising a stationary contact, a movably mounted snap-acting bimetallic element having a normal concavo-convex flexed position, a movable contact carried by said bimetallic element for cooperation with said fixed contact, means for biasing said bimetallic element for movement to a first circuit controlling position, and a manually operable member for moving said element to a second circuit controlling position, said bimetallic element when heated a predetermined amount by overload current operating to snap from said normal flexed position to an opposite concavo-convex position thereby automatically to open the contacts irrespective of the position of said manually operable member.

LUDWIG S. WALLE.